United States Patent [19]

Saitoh

[11] Patent Number: 5,613,016
[45] Date of Patent: Mar. 18, 1997

[54] AREA DISCRIMINATION SYSTEM FOR TEXT IMAGE

[75] Inventor: Takashi Saitoh, Yokohama, Japan

[73] Assignee: Ricoh Company, Ltd., Tokyo, Japan

[21] Appl. No.: 365,070

[22] Filed: Dec. 28, 1994

Related U.S. Application Data

[63] Continuation of Ser. No. 88,044, Jul. 6, 1993, abandoned.

[30] Foreign Application Priority Data

Jul. 6, 1992 [JP] Japan ................................. 4-178192

[51] Int. Cl.⁶ .................................................. G06K 9/34
[52] U.S. Cl. ......................... 382/174; 382/176; 382/180; 382/289
[58] Field of Search .................... 382/9, 16, 22, 382/46, 45, 51, 171, 174, 176, 180, 199, 289

[56] References Cited

U.S. PATENT DOCUMENTS

| | | | |
|---|---|---|---|
| 4,503,556 | 3/1985 | Scherl et al. | 382/9 |
| 4,866,784 | 9/1989 | Barski | 382/9 |
| 5,054,091 | 10/1991 | Tanaka et al. | 382/9 |
| 5,093,868 | 3/1992 | Tanaka et al. | 382/9 |
| 5,228,095 | 7/1993 | Abe | 382/9 |
| 5,245,676 | 9/1993 | Spitz | 382/45 |
| 5,285,504 | 2/1994 | Pavlidis et al. | 382/46 |
| 5,335,290 | 8/1994 | Cullen et al. | 382/46 |

OTHER PUBLICATIONS

"A Method of Document–image Segmentation Based on Projection Profiles, Stroke Densities and Circumscribed Rectangle", Akiyama, T., Systems and Computers in Japan, vol. 18, No. 4, pp. 101–111, Apr. 1987.

*Primary Examiner*—Jose L. Couso
*Assistant Examiner*—Matthew C. Bella
*Attorney, Agent, or Firm*—Woodcock Washburn Kurtz Mackiewicz & Norris

[57] ABSTRACT

An area discrimination system discriminates areas from each other in a binary image. The system includes a reducing unit for reducing a binary image supplied from an external unit, a skew detector for detecting skew of the binary image with respect to a predetermined direction, an extracting unit for extracting black connected components from the reduced image, a block forming unit for forming blocks, each of which includes a plurality of black connected components close to each other, a first merging unit for merging blocks satisfying first conditions into a a character string by using of the skew detected by said skew detector, the first conditions including at least a condition depending on skew of the binary image, and a second merging unit for merging character strings satisfying second conditions into a column by using of the skew detected by said skew detector, the second conditions including at least a condition depending on skew of the binary image.

10 Claims, 10 Drawing Sheets

AREA DISCRIMINATION SYSTEM FOR TEXT IMAGE

This is a continuation of U.S. patent application Ser. No. 08/088,044, filed Jul. 6, 1993, now abandoned.

BACKGROUND OF THE INVENTION (1) Field of the Invention

The present invention generally relates to an area discrimination system applicable to an optical character recognition (OCR) system, and more particularly to an area discrimination system for discriminating an area including character strings in a text image on a document, the text image being formed of columns each having one or a plurality-of character strings in vertical lines or in horizontal lines.

(2) Description of the Related Art

A method has been known in which method it is determined, based on a projecting histogram of black pixels on fringes of a document, that an area having a high distribution of black pixels includes character strings. This method is disclosed in a paper (Akiyama and Masuda, "A Method of Document-image Segmentation Based on Projection Profiles, Stroke Densities and Circumscribed Rectangles", The Transactions of the Institute of Electronics, Information and Communication Engineers; 86/8 Vol. J69-D, No. 8, pp. 1187–1195).

In addition, another related method has been proposed in Japanese Patent Application No. 3-128340. In this method, white pixel strings and black pixel strings are extracted from each line of a reduced image of a document image, and a smoothing process is applied to the extracted white and black pixel strings, each white pixel string being referred to as a white run and each black pixel string being referred to as a black run. In the smoothing process, strings each of which is formed of black and short white runs put between long white runs are extracted, and the strings are connected to each other so that blocks are formed. Blocks determined as areas including character strings are merged into character strings and the character strings are further merged into columns including character strings. A skew of the document has been previously detected, and the above merging processes are performed in accordance with the skew of the document.

In the method disclosed in the above paper, since normal projection histogram of black pixels is not obtained under a condition in which the document is skewed, the projection histogram of black pixel must be corrected in accordance with the skew of the document. However, since the correction process must be applied to a whole document image, the number of steps in the correction process is very large. In addition, in a case where text images and other images (graphics, photographs and the like) are mixed on the document, black pixels of text images and other images are mixed on the histogram. Thus, it is difficult to discriminate text image areas from other image areas using the histogram of black pixels. Furthermore, in a case where intervals of characters in characters strings on a text image are large, such as in a case of a word processing document image, spaces between characters are determined as spaces between columns. As a result, a text image area to be a single column is divided into a plurality columns.

In the method disclosed in the above Japanese Patent Application, each block including black and white runs connected to each other is merged into a character string and character strings are further merged into columns in accordance with the skew of the document. Thus, it is not necessary to perform the skew correction process including a large number of steps. Even if the document image includes text images and other images such as photograph images, the text images can be discriminated from the other images. However, since the smoothing process is performed, in a case where a text image is positioned extremely close to other images, it is difficult to discriminate the text image from the other images.

SUMMARY OF THE INVENTION

Accordingly, a general object of the present invention is to provide a novel and useful area discrimination system in which the disadvantages of the aforementioned prior art are eliminated.

A more specific object of the present invention is to provide an area discrimination system in which character strings and columns can be precisely discriminated from other areas on a document in accordance with the skew of the document.

The above objects of the present invention are achieved by an area discrimination system for discriminating areas from each other in a binary image, the system comprising: reducing means for reducing a binary image supplied from an external unit and for outputting a reduced image; skew detecting means for detecting skew of the binary image with respect to a predetermined direction; extracting means, coupled to the reducing means, for extracting first areas, each of which corresponds to a set of connected black pixels, from the reduced image; block forming means, coupled to the extracting means, for forming blocks, each of which includes a plurality of first areas close to each other; first merging means, coupled to the skew detecting means and the block forming means, for merging blocks satisfying first conditions into a second area corresponding to a character string by using of the skew detected by the skew detecting means, the first conditions including at least a condition depending on skew of the binary image; and second merging means, coupled to the skew detecting means and the first merging means, for merging second areas satisfying second conditions into a third area corresponding to a column by using of the skew detected by the skew detecting means, the second conditions including at least a condition depending on skew of the binary image, whereby third areas obtained by the second merging means are discriminated from each other in the binary image.

According to the present invention, blocks satisfying the first conditions including at least a condition depending on the skew of the binary image are merged into a second area, and the second areas satisfying the second conditions including at least a condition depending on the skew of the binary text are merged into a third area. Thus, even if the binary image is skewed, the third areas corresponding to columns can be precisely discriminated from each other in the binary image. In addition, the smoothing process is not needed to obtaine the third areas. Thus, even if characters are close to each other in the binary image, the third areas coresponding to columns including a plurality of characters can be precisely discriminated from each other.

Additional objects, features and advantages of the present invention will become apparent from the following detailed description when read in conjunction with the accompanying drawings.

DESCRIPTION OF PREFERRED EMBODIMENTS

A description will now be given of an embodiment of the present invention.

Figure 1:
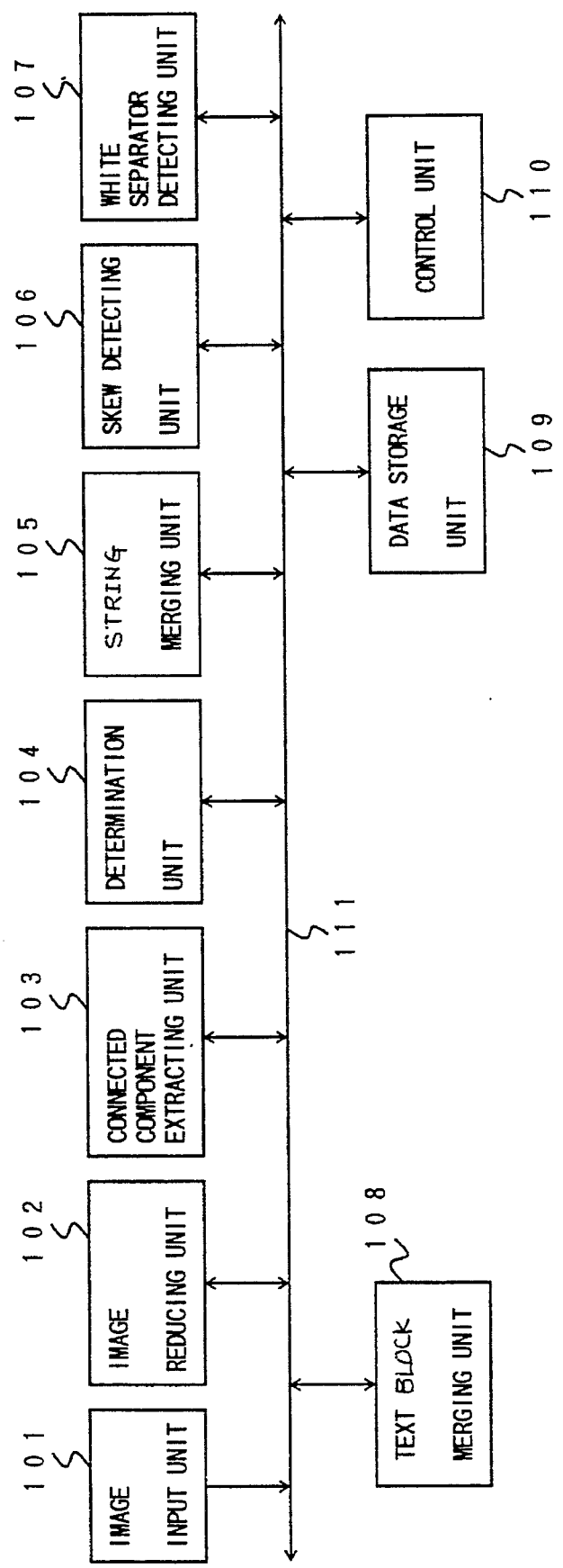
FIG. 1 shows a block diagram illustrating a text image discrimination system according to an embodiment of the present invention.

Referring to FIG. 1 which shows a text area extracting system, an image input unit 101 such as a scanner, such a system comprises an image reducing unit 102, a connected component extracting unit 103, a determination unit 104, a character merging unit 105, a skew detecting unit 106, a white separator detecting unit 107, a text image merging unit 108, a data storage unit 109 and a control unit 110, which are connected to each other by a system bus 110. The input unit 101 optically reads a document and outputs binary image. The image reducing unit 102 reduces an input image represented by the binary image data supplied from the input unit 101 and outputs reduced image data. The connected component extracting unit 103 extracts connected components of black pixels from the reduced image represented by the reduced image data supplied from the image reducing unit 102. The connected component of black pixels are referred to as a black connected component. The determination unit 104 determines the "type" of the black connected component (e.g., character candidate, vertical separator, horizontal separator, photograph), as described below, with reference to FIG. 2 step 204. The character merging unit 105 merges black connected components positioned close to each other with each other, which components are determined as character candidate by the determination unit 104.

The skew detecting unit 106 detects the skew of a document. The white separator detecting unit 107 detects a white separator which is a white space formed of white pixels on the image. The text image merging unit 108 merges character areas into a character string and further merges a character string into a column. The data storage unit 109 temporarily stores the black connected components, the white separators, merged character strings, columns and other data. The controller 110 controls all the above units in the system. Data is transmitted from each unit to another unit via the system bus 111.

Figure 2:
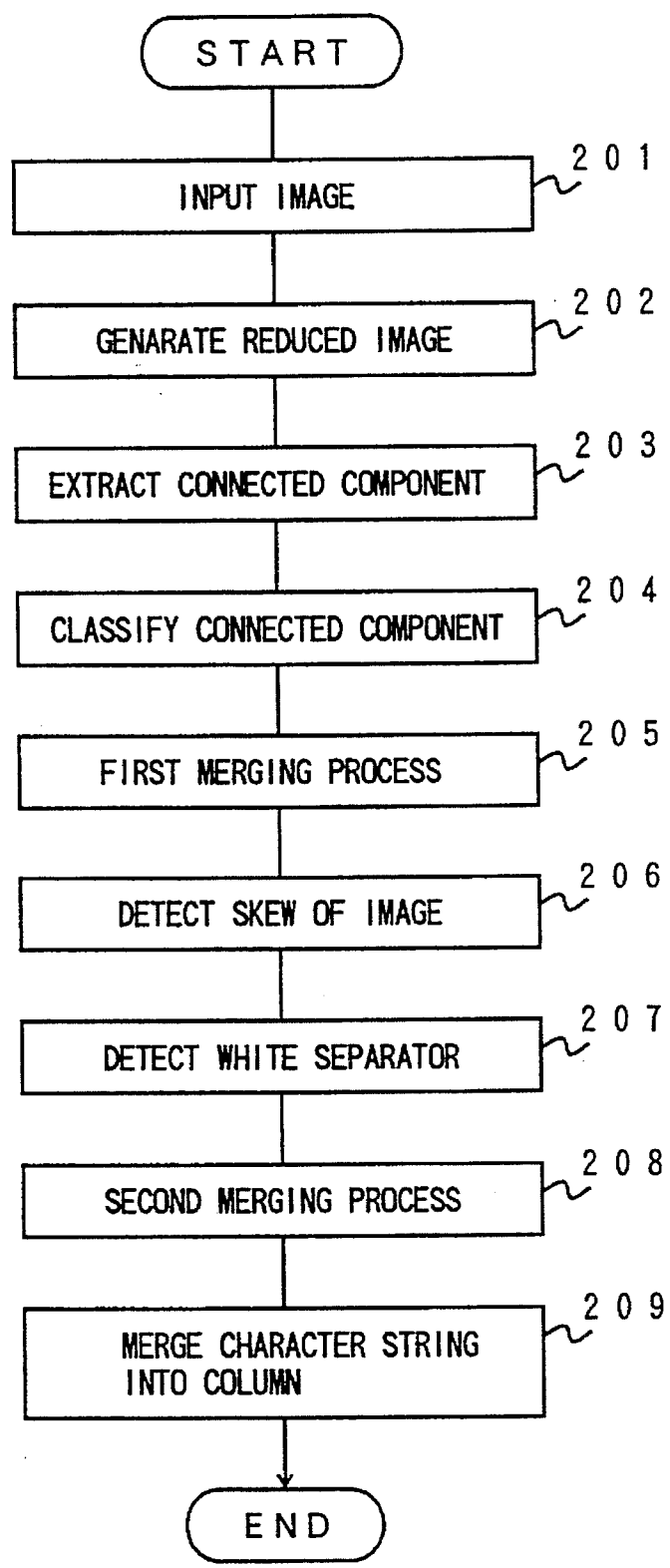
FIG. 2 is a flow chart illustrating a process executed in the text image discrimination system shown in FIG. 1.

The process is executed in the system in accordance with a flow chart as shown in FIG. 2.

Referring to FIG. 2, in step 201, the image input unit 101 optically reads a document and outputs binary image data. In step 202, the image reducing unit 101 receives the binary image data from the image input unit 101 and generates reduced image data. The reduced image data is formed, for example, as follows. A logical sum of items of pixel data for each 8×8 matrix in the binary image in which pixels are arranged in a rate of 400 dpi (dot per inch) is formed as each item of pixel data in the reduced image. In step 203, the connected component extracting unit 103 extracts a black connected component from the reduced image obtained in step 202. Each black connected component is defined as a circumscribed rectangle of an image formed of connected black pixels. In step 204, the determination unit 104 determines, based on a size, a shape (a ratio of the height to the width) and the like, whether each black connected component obtained in step 203 is a character candidate, a vertical or horizontal separator which is a segmenting line formed of black pixels, a photograph or a picture. In step 205, the character merging unit 105 selects black connected components positioned close to each other from among the black connected components determined as the character candidates, and the selected black connected components are merged with each other. A block including black connected components merged with each other is obtained in step 205. The process performed in step 205 is referred to as a first merging process. In step 206, the skew detecting unit 106 detects the skew of the input image based on the arrangement of black connected components in an input image corresponding to each block obtained by the first merging process. The method for detecting the skew angle of the input image has been described, for example, in the above Japanese Patent Application.

After the skew angle of the input image is detected in step 206, in step 207, white separators are extracted from the input image based on the arrangement of blocks obtained in step 205 and the skew information obtained in step 206. A detailed description will now be given, with reference to FIGS. 3–7, of the process for extracting the white separators.

Figure 3:
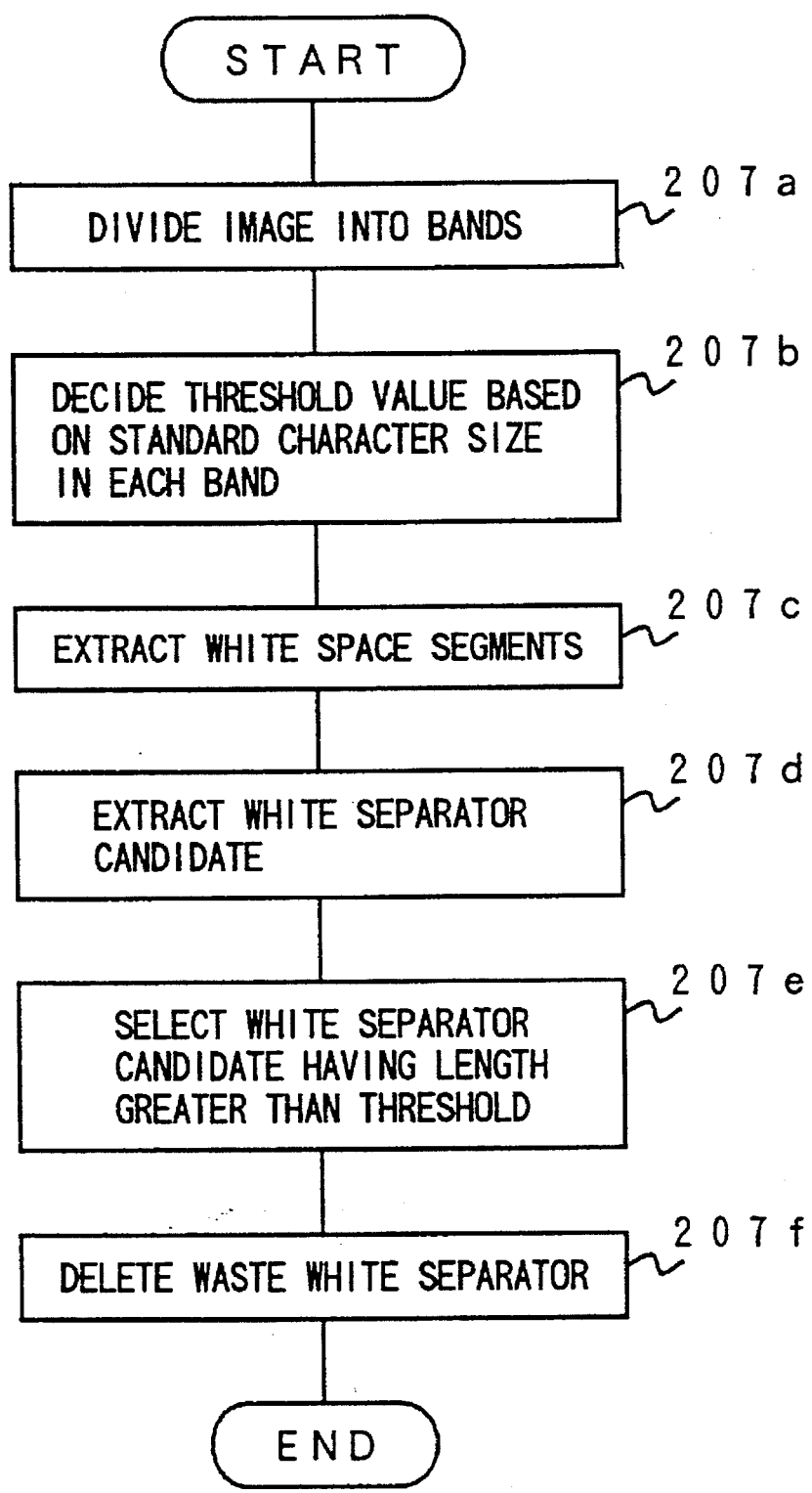
FIG. 3 is a flow chart illustrating a process for extracting white separators from an image area.
Figure 4:
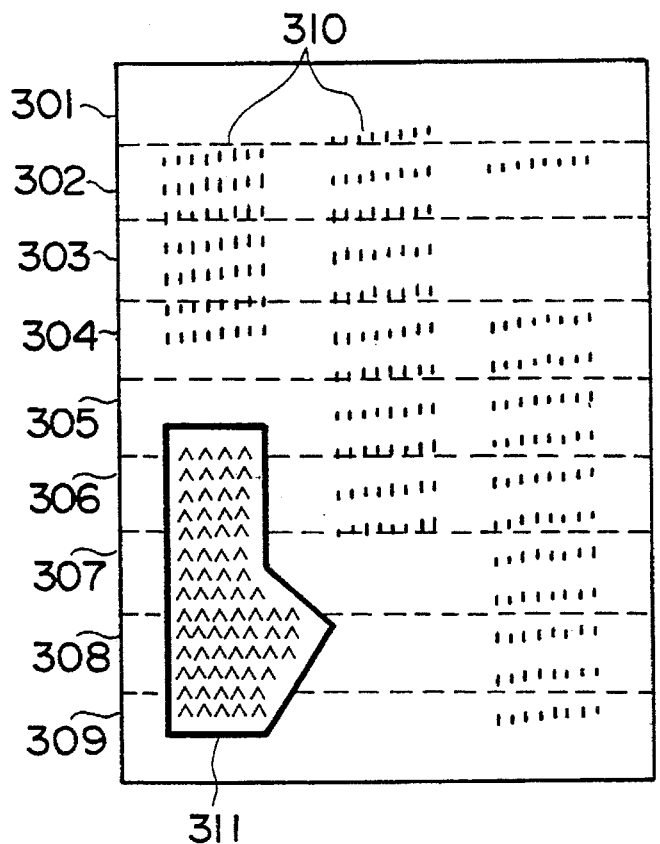
FIG. 4 is a diagram illustrating the band segmentation of an image area.

Referring to FIG. 3, which shows a detailed process for detecting the white separators, in step 207a, the input image is divided into a plurality of bands, each band extending in the horizontal direction in a case where character strings are written in the horizontal lines on the document read by the input unit 101. If, on the other hand, character strings are written in the vertical lines on the document, the input image is divided into a plurality of bands such that each band extends in the vertical direction. FIG. 4 shows bands into which the input image is divided. Referring to FIG. 4, in step 207a, an input image is divided into bands 301 through 309, each band extending in the horizontal direction. The input image 300 includes character strings 310 which are in the horizontal lines on the document. The input image 300 also includes a graphic area 311 having graphics. Although the input image 300 is skewed such that the top right hand corner of the input image 300 lies higher than the top left hand corner of the input image 300, the input image 300 is divided precisely in the horizontal direction. Each set of character strings 310 is surrounded by wide white spaces and is referred to as a column. In FIG. 4, there are four columns including a column having a single character string. In step 207*b*, blocks overlapping each band are selected from among blocks obtained in the first merging process, and the histogram of heights of the selected blocks is made. Referring to the histogram, the most frequent height is used as a standard character size for a band. The standard character size is multiplied by a predetermined factor (e.g. 1.1) and the result obtained for each band is a threshold value $th_a$ used for determining a white space segment.

Figure 5:
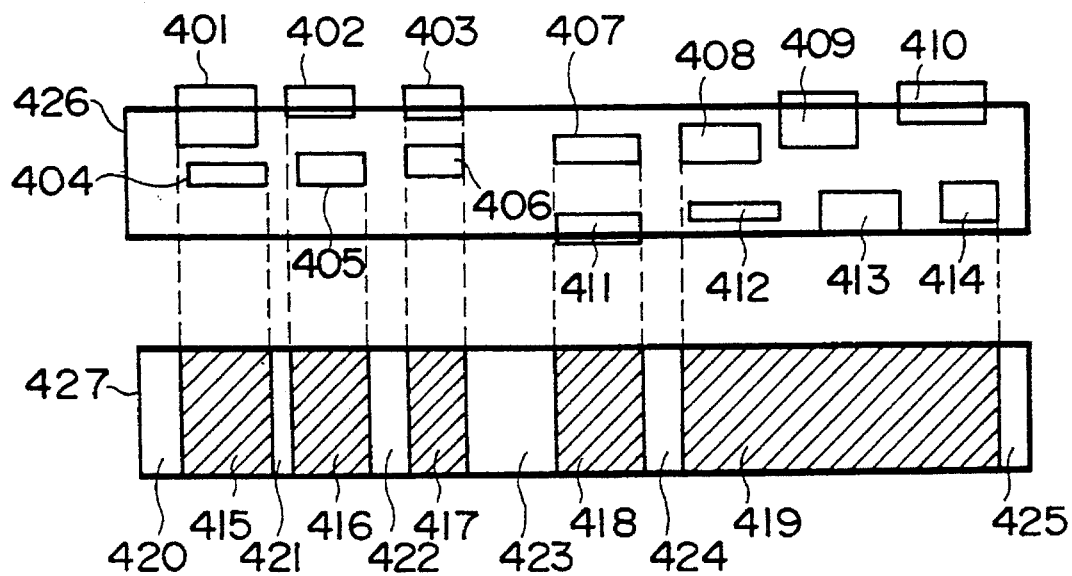
FIG. 5 is a diagram illustrating a distribution of character strings in each band, and a vertical projection of character strings with the distribution.

In step 207*c*, in each band, the vertical projection of blocks included in and overlapping the band is made. Referring to the vertical projection of the blocks, white space segments each having a width equal to or greater than the threshold value $th_a$ obtained in step 207*b* are extracted from among white space segments which are not interrupted by the blocks. A process executed in step 207*c* will be described below with reference to FIG. 5. Referring to FIG. 5, a band 426 extends in the horizontal direction. Blocks 401 through 414 are included in and overlap the band 426. A vertical projection area 427 corresponding to the band 426 is made. The vertical projection area 427 includes black space areas 415 through 419 each of which corresponding to vertical projections of the blocks 401 through 414 and white space segments 420 through 425 which are not interrupted by the blocks 401 through 414. Only white space segments each having a width equal to or greater than the threshold value $th_a$ are extracted from the white space segments 420 through 425. Alternatively, all the white space segments 420 through 425 may be extracted from them.

Figure 6:
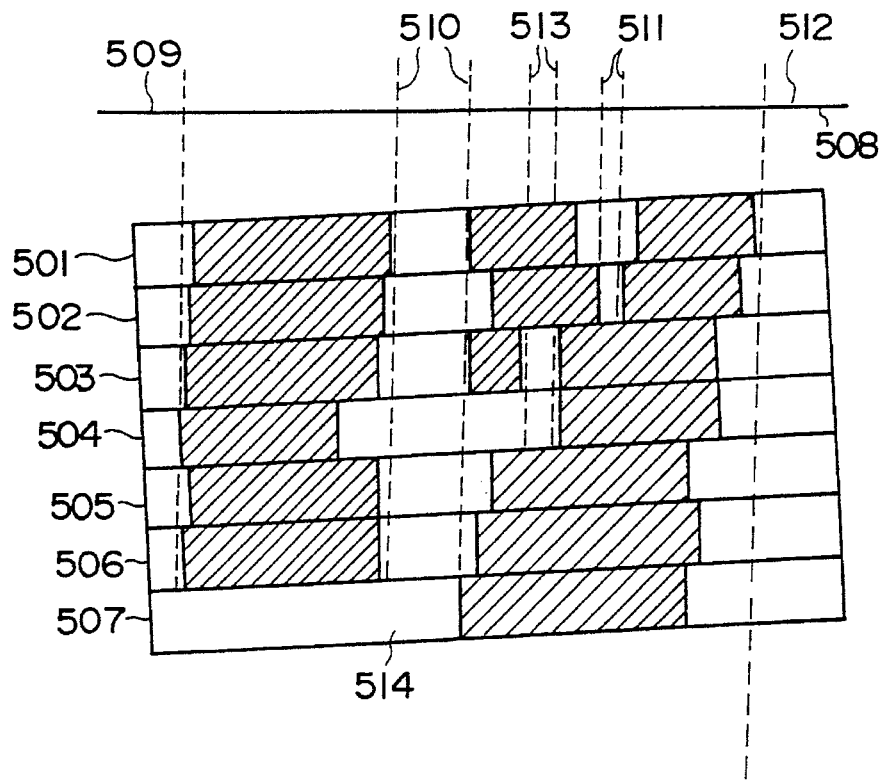
FIG. 6 is a diagram illustrating extraction of white separators using the extension of white portions.

In step 207*d*, based on connecting relations among the white space segments extracted from the bands in step 207*c*, white separator candidates are obtained. A process executed in step 207*d* will be described below with reference to FIG. 6. Referring to FIG. 6, bands 501 through 507 into which the input image is divided are arranged, and white space segments extracted in step 207*c* are indicated in each band. A projecting plane 508 is defined in accordance with the skew angle of the input image. The respective bands are successively processed in accordance with the order of their closeness to the projecting plane 508. First, regarding the bands 501 and 502, white space segments in the bands 501 and 502 are projected onto the projecting plane 508, and white space segments overlapping with each other on the projecting plane 508 are selected. A overlapping portion of the selected white space segments is defined as a white separator candidate. In FIG. 6, overlapping portions 509, 510, 511 and 512 are defined as white separator candidates. Next, the band 503 is searched for white space segments overlapping with the white separator candidates on the projecting plane 508, each white space segment having a width in a range between a lower threshold value $th_b$ and an upper threshold value $th_c$. The upper threshold value $th_c$ may be, for example, a fixed value of 3 centimeters on the input image, or may be also a few times as large as the above threshold value $th_a$ used for extracting white space segments. That is, each of the white space segments to be detected has a width equal to or greater than a predetermined value and is sufficiently wider than a space between columns so that character strings in different columns are not merged in later processes. If white space segments satisfying the above condition are detected, corresponding white separator candidates extend downward. On the other other hand, if such segments are not detected, corresponding white separator candidates end. In FIG. 6, the white separator candidate 511 ends at a position prior to the band 503, and the white separator candidates 509, 510 and 512 extend downward. If there is a white space segment in a band which space does not overlap with any white separator candidates on the projecting plane 508, the white space segment is defined as a white separator candidate and the white separator candidate starts to extend from the white space segment. In FIG. 6, a white space segment from which a white separator candidate 513 should start to extend is detected in the band 503.

After this, the above processes are also repeated in the other bands.

In the band 507 shown in FIG. 6, there is a white space segment 514 overlapping both the white separator candidates 509 and 510. In this case, as the white space segment 514 has the width greater than the upper threshold value $th_c$, both of the white separator candidates 509 and 510 end at the band 506. As a result of the above process, in an example shown in FIG. 6, the white separator candidates 509, 510 and 512 are finally obtained.

Next, in step 207*e*, only white separator candidates having the length equal to or greater than a threshold value $th_d$ are selected as white separators from among the white separator candidates obtained in the above process. The threshold value $th_d$ is large, for example, three times as large as the length of each band. In a case shown in FIG. 6, all the white separator candidates 509, 510 and 512 are selected as the white separators.

Figure 7:
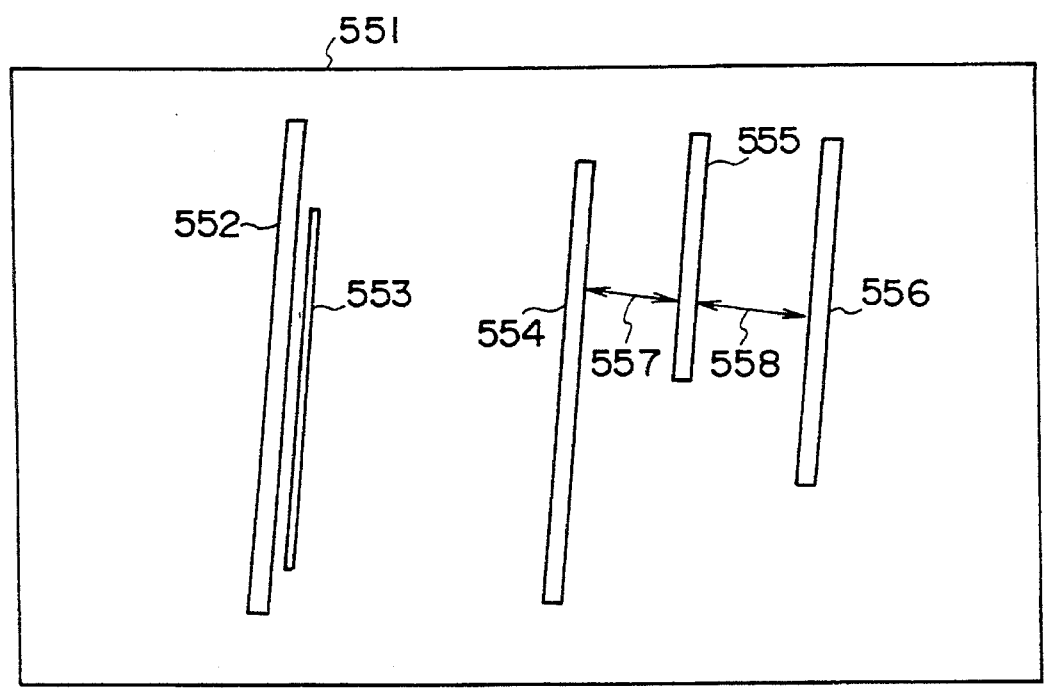
FIG. 7 is a diagram illustrating elimination of remaining white separators.

All the white separators 509, 510 and 512 may be effective in the later process. However, in this embodiment, to reduce the number of steps in the later processes, white separators waste in the later processes are deleted. That is, in step 207*f*, the waste white separators are deleted. In a case shown in FIG. 6, the white separators 509 and 512 positioned at ends of the input image are deleted, and only the white separator 510 remains. If two white separators are positioned very close to each other, a white separator shorter than another is deleted. For example, in a case, as shown in FIG. 7, where white separators 552 and 553 are positioned very close to each other, the shorter white separator 553 is deleted. If there are white separators more than a predetermined number within a reference distance from a target white separator, the target white separator is deleted. The reference distance is, for example, approximately ten times as large as the standard character size. In the case shown in FIG. 7, there are respectively two white separators 554 and 556 in distances 557 and 558 from a white separator 555, the distances 557 and 558 are less than the reference distance. Thus, the white separator 555 is deleted. As has been described above, in the case shown in FIG. 7, the white separators 552, 554 and 556 are finally extracted.

According to the process for detecting white separators, each white separator is formed of white space segments each having a width equal to or greater than the threshold value $th_a$ depending on the standard character size in each band. Thus, even if a space between characters is varied, the white separator can be stably detected. In addition, In a case where there are a plurality of white separators within the reference distance from a target white separator, the target white separator is deleted. Thus, a white separator which is not to be extracted can be deleted.

Figure 8:
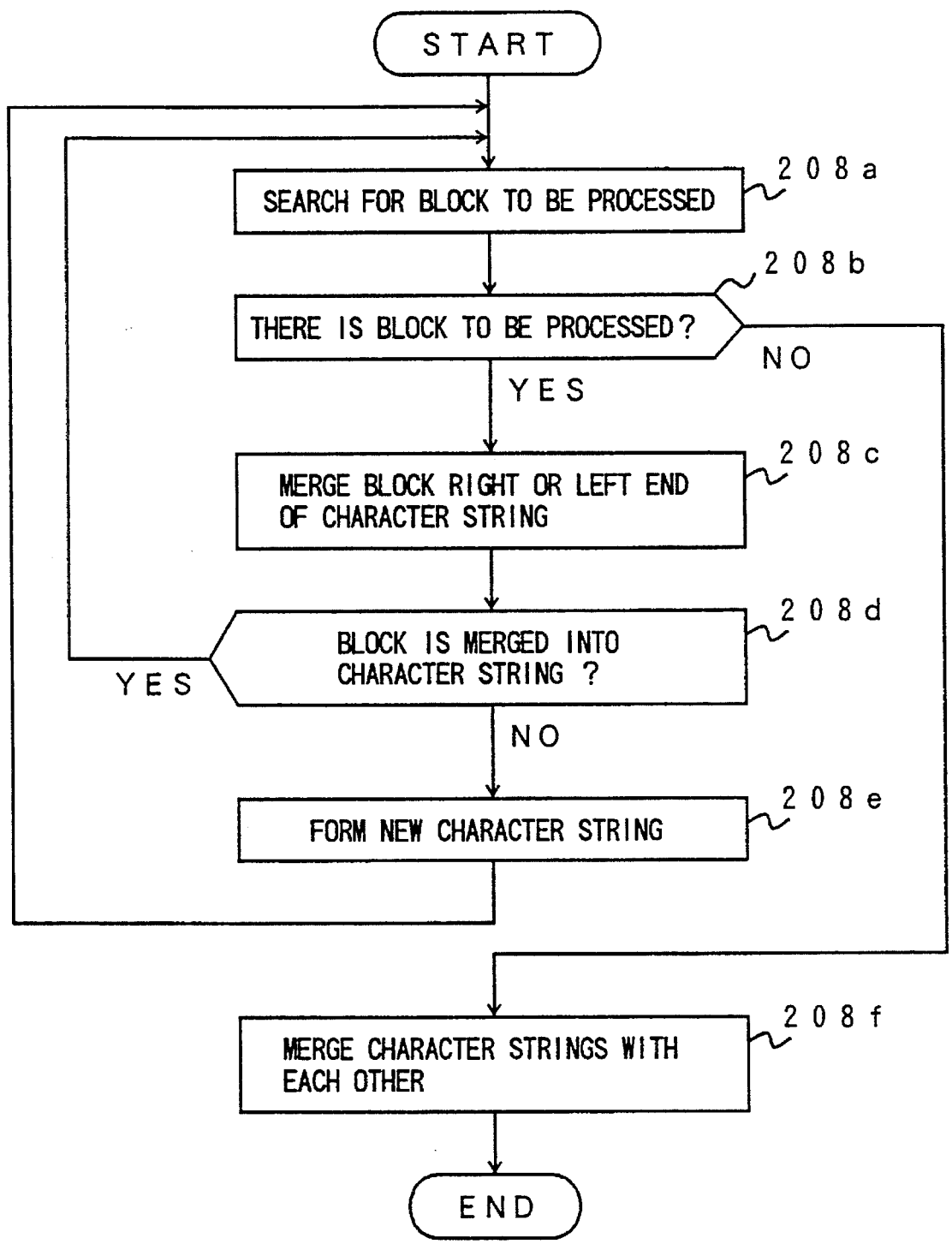
FIG. 8 is a flow chart illustrating a process for merging a character string area with a character string.
Figure 9A:
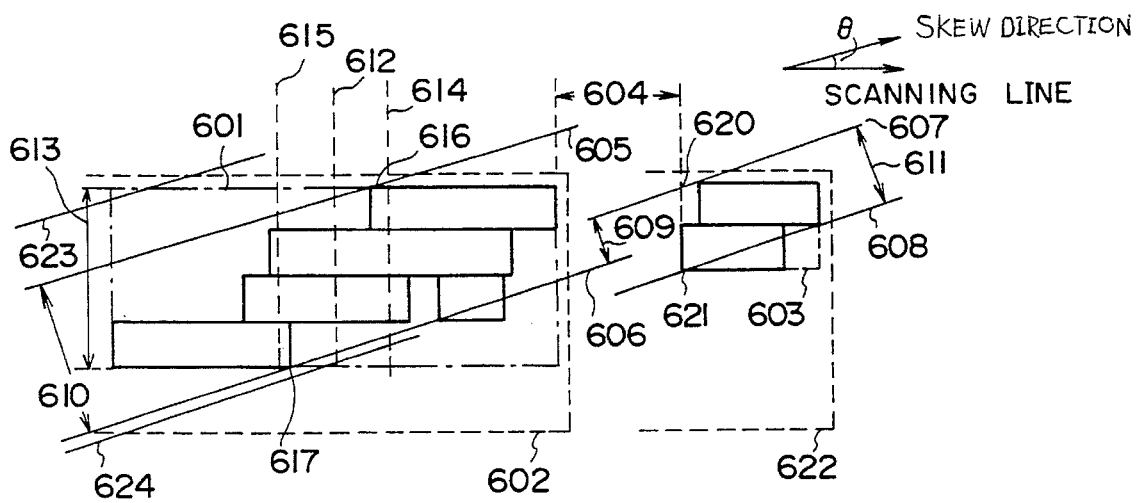
FIG. 9A is a diagram illustrating of merging of areas into a character string.

Returning to FIG. 2, after step 207 described above is completed, in step 208, the text image merging unit 108 further merges character strings using the white separators extracted in step 207 and the segmenting lines formed of black pixels and with reference to the skew angle of the input image. The process performed in step 208 is referred to as a second merging process. FIG. 8 shows a flow chart of the second merging process and FIGS. 9A, 9B, 9C, 10A and 10B show contents of the second merging process. In FIG. 9A, 603 indicates a block obtained in step 205 and to be process in step 208, 602 indicates a character string which has been generated by merging of blocks in step 208, and 601 indicates a block merged into the character string 602 and positioned at a right end of the character string 602. In this case, it is assumed that characters are written in horizontal lines on the document and the document is skewed by θ° with respect to the scanning line such that the top right hand corner of the document lies higher than the top left hand corner of the document.

Referring to FIG. 8, in steps 208a and 208b, the block 603 which has not processed in step 208 yet is detected. In step 208c, it is attempted to connect the block 603 to the block 601 positioned at the right end of the character string 602. In general, it is also attempted to connect a new block to a block positioned in the left end of the character string. If the following conditions 1) through 4) are satisfied, the block 603 is connected to the block 601 in the character string 602.

1) A distance 604 between the blocks 603 and 601 is equal to or less than a threshold value.

2) Height effective ranges of the blocks 603 and 601 overlap with each other in a height direction. In FIG. 9A, the block 603 has the height effective range between lines 607 and 608 parallel to the skew direction, and the block 601 has the height effective range between lines 605 and 606 parallel to the scanning line.

3) The difference between the character sizes 610 and 611 obtained from the height effective ranges is equal to or less than a threshold value.

4) There is no separator (the white separator obtained in step 207 and the segmentation line formed of black pixels) between the blocks 603 and 601.

The above height effective range is defined as follows.

In a case where an image is skewed, the height of each block obtained in step 205 is greater than the height of an actual character included in the block. Thus, in accordance with the skew angle of the image, a region indicating the actual height of the character included in the block is defined as the height effective range of the block. In FIG. 9A, a line 612 indicates a center of the width of the block 601, a position 614 is apart from the right end of the block 601 at a distance corresponding to the height 613 of the block, and a position 615 is apart from the left end of the block 601 at a distance corresponding to the height of the block. In a case where the image is skewed such that the top right hand corner of the image lies higher than the top left hand corner of the image, a region between the line 605 passing through the top left hand corner 616 of a top black run in the block 601 and the line 606 passing through the bottom right hand corner 617 of a bottom black run in the block 601 is defined as the height effective range of the block 601. The above lines 605 and 606 are skewed by θ° with respect to the scanning line.

Figure 9B:
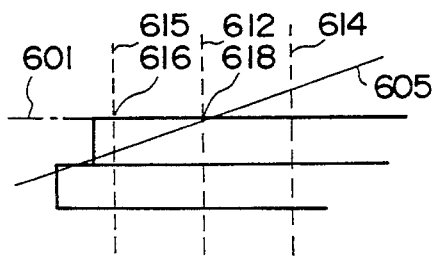
FIG. 9B is a diagram illustrating correction of an effective height range of each character string area.
Figure 9C:
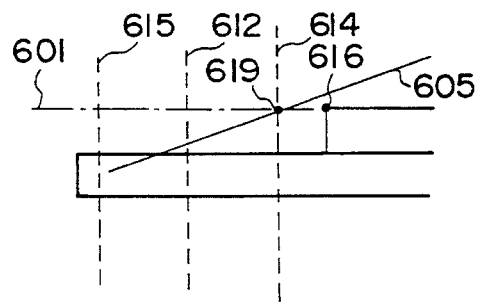
FIG. 9C is a diagram illustrating correction of an effective height range of each character string area.

In a case where the top left hand corner 616 of the top black run is in the left side of the position 612 as shown in FIG. 9B, the line 605 is corrected so as to pass through a point 618 at which a line passing through the position 612 and the circumscribed line of the block 601 are crossed and to be skewed by θ° with respect to the scanning line. On the other hand, in a case where the top left hand corner 616 of the top black run is in the right side of the position 614 as shown in FIG. 9C, the line 605 is corrected so as to pass through a point 619 at which the circumscribed line of the block 601 and the line passing through the position 614 are crossed and to be skewed by 0° with respect to the scanning line. In a case where the right bottom hand corner 617 of the bottom black run is out of a range between positions 612 and 615, the line 606 are also corrected in the same manner as the line 605.

On the other hand, if the image is skewed such that the top left hand corner of the image lies higher than the top right hand corner of the image, the height effective range of the block is obtained in a manner as shown in a figure obtained inverting the right and left sides of FIG. 9A. That is, the height effective range may be defined by the line 605 passing through a top right hand corner of the top black run in the block 601 and the line 606 passing through a bottom left hand corner of the bottom black run in the block 601.

As to the block 603, as the block 603 obtained in the first merging process in step 205 is small, the height effective range of the block 603 is obtained in the different manner from the block 601. That is, a region between a line 607 passing through the top left hand corner of the block 603 and a line 608 passing through the bottom left hand corner of the block 603 is defined as the height effective range of the block 603, the top left hand corner and the bottom left hand corner being skewed by θ° with respect to the scanning line. The distance 611 between the lines 607 and 608 is defined as the character size. If the block 603 has the same size as the block 601, the height effective range of the block 603 is obtained in the same manner as that of the block 601 described above. The blocks 601 and 603 are connected so that the block 603 is merged into the character string 602. As a result, a updated character string 622 is obtained. The sum of the height effective range (between lines 623 and 624) of the character string 602 and the height effective range (between the lines 607 and 608) of the block 603 is the height effective range (between the lines 623 and 608) of the updated character string 622.

Returning to FIG. 8, if the block 603 is merged into the character string 602 with satisfying all the above four conditions, the process is returned from step 208d to step 208a. A next block is processed in accordance with the above process. If at least one condition out of the above the above four conditions is not satisfied, the next block is not merged into the character string. A new character string having the next block is generated in step 208e, and the process restarts from step 208a. The above process is repeated until it is determined in step 208b that there is no block which has been not processed yet.

Figure 10A:
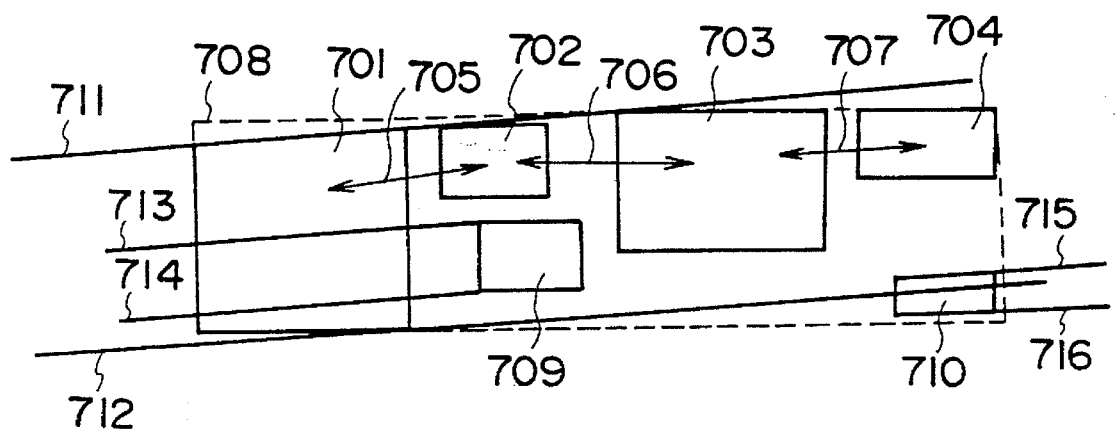
FIG. 10A is a diagram illustrating an example of character strings merged with each other.
Figure 10B:
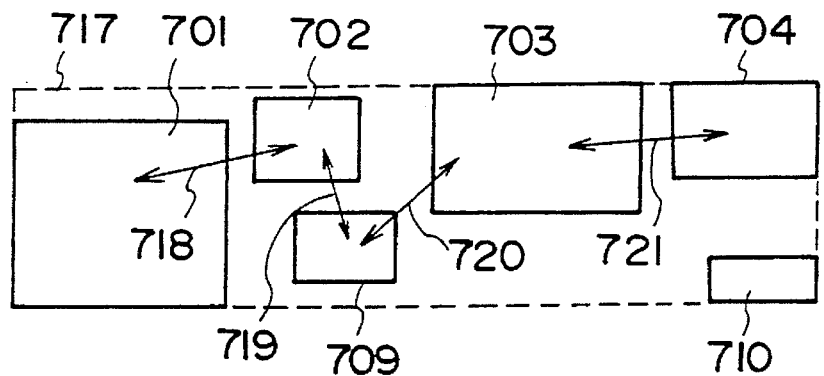
FIG. 10B is a diagram illustrating an example of character strings updated based on inclusion relations.

FIG. 10A shows an example of blocks which are merged with each other in accordance with steps 208a through 208e. In FIG. 10A, blocks 701, 702, 703 and 704 are successively connected in this order, so that links 705, 706 and 707 are formed between blocks. If it is determined, in step 208b, that there is no block which has been not processed yet, it is further determined, in step 208f, whether or not there is the inclusive relation between character strings. If there is the inclusive relation between character strings, the character strings are merged with each other.

In a case as shown in FIG. 10A, character strings 708, 709 and 710 are obtained. The character string 708 has the blocks 701, 702, 703 and 704 successively connected in this order in accordance with steps 208a through 208e. Each of the character strings 709 and 710 is formed of a single block. A region between lines 711 and 712 is defined as the height effective range of the character string 708, a region between lines 713 and 714 is defined as the height effective range of the character string 709, and a region between lines 715 and 716 is defined as the height effective range of the character string 710. In this case, based on the region in the width direction and the height effective range of each of the character strings 708, 709 and 710, it is determined that the character strings 709 can be included in the character string 708. Thus, the character string 709 is merged with the character string 708, and the blocks 701 and 702 in the character string 708 and a block in the character string 709 and the blocks 703 and 704 in the character string 708 are successively connected in this order. Links 718, 719, 720 and 721 are formed between the blocks.

Returning to FIG. 2, when the process for merging character strings with each other as described above is completed, a process for merging the characters string into columns is performed in step 209. This process is performed in accordance with a flow chart shown in FIG. 11, and a character string is merged into a column as shown in FIG. 12.

Figure 12:
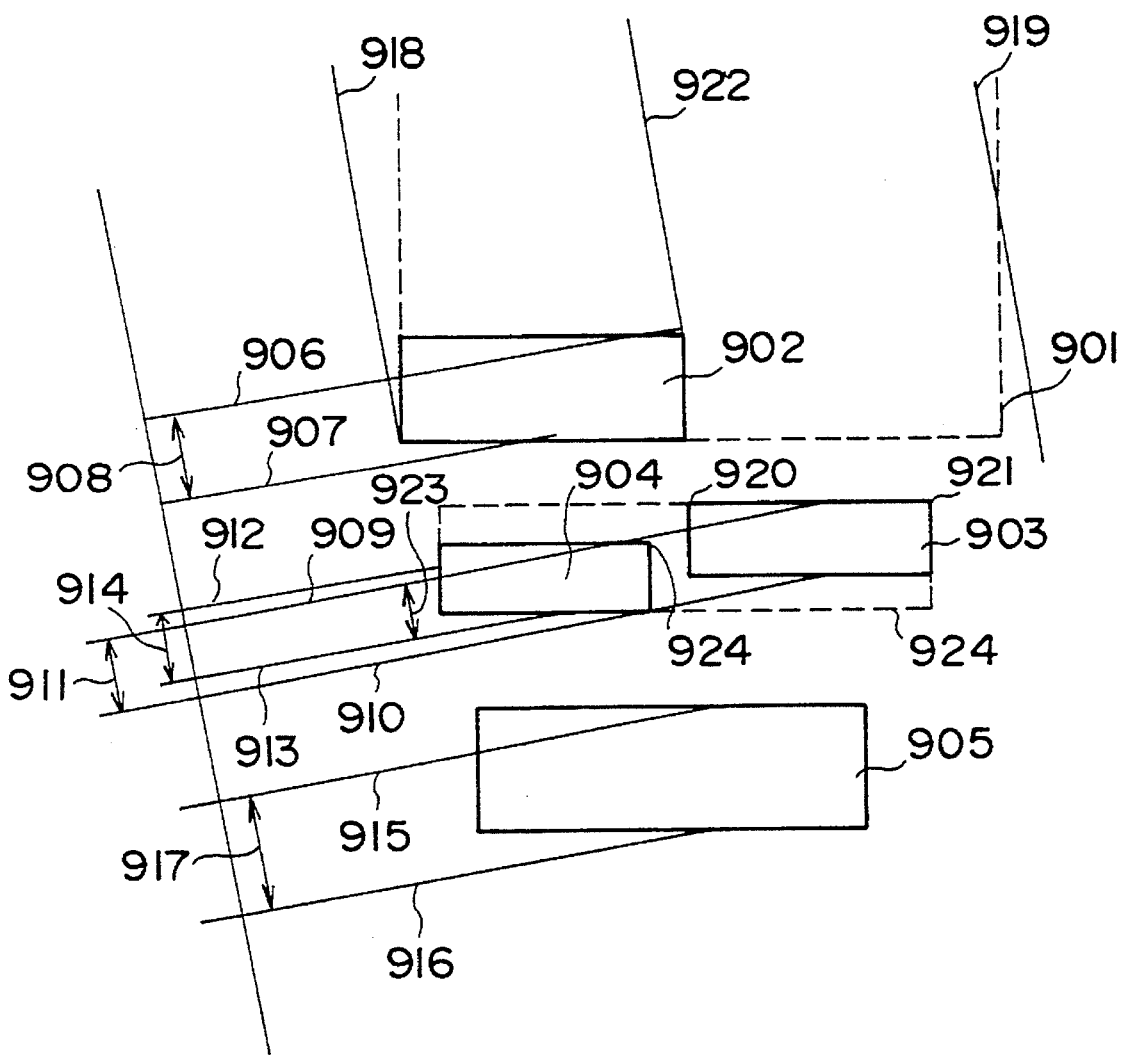
FIG. 12 is a diagram illustrating merging of character strings into a column.

Referring to FIG. 12, character strings 902, 903, 904 and 905 are arranged, and the character string 902 is included in a column 901. A region between lines 906 and 907 is defined as the height effective range of the character string 902, and the character string 902 has a character size 908. A region between lines 909 and 910 is defined as the height effective range of the character string 903, and the character string 903 has a character size 911. A region between lines 912 and 913 is defined as the height effective range of the character string 904, and the character string 904 has a character size 914. A region between lines 915 and 916 is defined as the height effective range of the character string 905, and the character string 905 has a character size 917. The image is skewed such that the top right hand corner of the image lies higher than the top left hand corner of the image.

Figure 11:
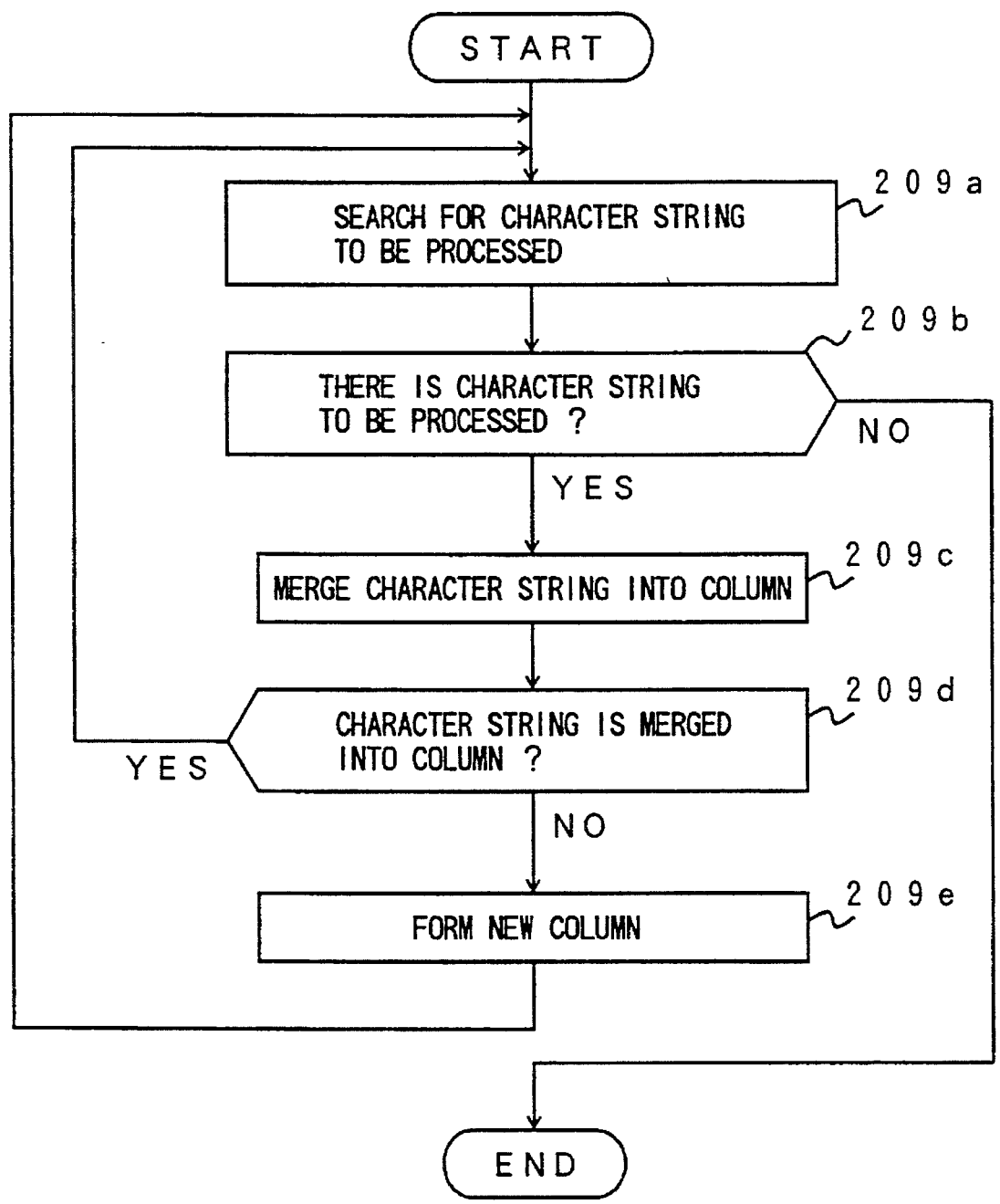
FIG. 11 is a flow chart illustrating a process for merging character strings into a column.

Referring to FIG. 11, in step 209a, a searching process for a character string which is to be merged into a column is performed, and it is determined, in step 209b, whether or not the character string to be merged into a column is detected. If the character string to be merged into a column is detected, it is attempted to merge the character string into a column which has been already made in step 209c. The character stings 902, 903, 904 and 905 are successively processed in an order of positions from an upper position in FIG. 12.

It is assumed that the character string 903 is selected as a character string to be processed in step 209c. In this case, if the character string 903 and the character string 902 positioned at the bottom row in the column 901 which has been already made at this time satisfy the following conditions 5) through 9), the character string 903 is merged into the column 901 so as to be positioned at the next row of the character string 902. That is, the column 901 is updated by the merging of the character string 903 into the column 901. A row is formed of one or a plurality of character strings. In FIG. 12, only the character string 902 forms a row.

5) The difference between character sizes 908 and 911 of respective character strings 902 and 903 is equal to or less than a threshold value.

6) A space between the bottom position 907 of the character string 902 and the top position of the character string 903 falls within a predetermined range. That is, a space between rows on which the character strings 902 and 903 are positioned falls within the predetermined range.

7) In a case where the number of rows in the column 901 is equal to or greater than a threshold value (e.g. three), the difference between an average space in the column 901 and the space described in the above condition 6) is equal to or less than a threshold value, the average space being an average of spaces between rows in the column 901.

8) Width effective ranges of the column 901 and the block 903 overlap with each other in a width direction. In FIG. 12, the column 901 has the width effective range between lines 918 and 919, and the block 903 has the width effective range between points 920 and 921 perpendicular to the scanning line.

9) There is no separator (including the white separator and the segmenting line formed of black pixels) in the space between the rows of the character strings 902 and 903.

The above width effective range of the column described in the condition 8) is defined as follows.

Width effective ranges of respective rows in the column are calculated, and the sum of these width effective ranges is then calculated. The sum of them is defined as the width effective range of the column. These calculations is performed every time a row or a character string is merged into the column.

A width effective range of each row is defined as follows.

A description will now be directed, for example, to a row formed of only the character string 902. In FIG. 12, the image is skewed with respect to the scanning line such that the top right hand corner of the image lies higher than the top left hand corner of the image. In this case, a region between a line 918 passing through the bottom left hand corner of the character string 902 and a line 922 passing through the top right hand corner of the character string 902 is defined as the width effective range of the row, the lines 918 and 922 having the same skew angle as the image. On the other hand, if the image is skewed with respect to the scanning line such that the top right hand corner of the image lies lower than the top left hand corner of the image, a region between a line passing through the top left hand corner of the character string 902 and a line passing through the bottom right hand corner of the character string 902 is defined as the width effective range, the lines having the same skew angle as the image.

In the example shown in FIG. 12, the character strings 903 satisfies the above five conditions. Thus, the character string 903 forms a new row in the column 901. After this, the character string 904 is processed, and the character string 904 is merged into the column 901 as follows.

The character string 904 and the character string 903 positioned at the bottom row in the column 901 updated as described above do not satisfy the condition 6). Thus, it is determined whether or not the character string 904 satisfies the following conditions 10) through 12). If the character string 904 satisfies the following conditions, the character strings 904 and 903 are merged with each other.

10) The character string 904 and a row immediately above the bottom row including the character string 903 satisfy the above five conditions 5) through 9).

11) A portion 923 on which the height effective ranges of the character string 904 and the bottom row including the character string 903 overlap in the height direction is equal to or greater than a threshold value.

12) There is no separator between the character string 904 and the bottom row including the character string 903.

The character string 904 and the bottom row including the character string 903 satisfy the above conditions 10) through 12). Thus, the character string 904 is merged into the bottom row including the character string 903. As a result, the bottom row of the column 901 is updated so as to include both the character strings 903 and 904.

Next, the character string 905 is processed. If is is determined, in step 209d, that a character string is not merged into a column, a new column is formed of the character string in step 209e. As the character string 905 does not satisfy the above conditions 5) through 12), the character string 905 is not merged into the column 901. Thus, a new column is formed of only the character string 905. After this, when it is determined, in step 209b, that there is no character string to be processed, the process is completed.

According to the above embodiment, even if the document to be optically read is skewed with respect to the scanning line, character stings and columns can be extracted from an image without correcting the skew of the large amount of text image data. In addition, as the smoothing process for smoothing a reduced image is not performed, a column can be segmented from other area very close to the column. Furthermore, white separators are used for extracting columns from the text image. Thus, even if the text image has columns arranged at narrow intervals such as in a newspaper, columns is prevented from being merged with each other. In addition, even if the text has has character strings each having characters arranged at wide intervals, each character string is prevented from being divided into a plurality parts.

The present invention is not limited to the aforementioned embodiments, and variations and modifications may be made without departing from the scope of the claimed invention.

What is claimed is:

1. An area discrimination system for discriminating areas from each other in a binary image, said system comprising:

reducing means for reducing a binary image supplied from an external unit and for outputting a reduced image;

skew detecting means for detecting a skew of the binary image with respect to a predetermined direction;

extracting means, coupled to said reducing means, for extracting from the reduced image, first areas, each of which first areas corresponds to a set of connected black pixels;

block forming means, coupled to said extracting means, for forming blocks by merging the first areas in a main scanning direction in accordance with a first merging rule;

first merging means, coupled to said skew detecting means and said block forming means, for merging blocks into a second area corresponding to a character string in accordance with a second merging rule using the skew detected by said skew detecting means; and second merging means, coupled to said skew detecting means and said first merging means, for merging second areas into a third area corresponding to a column in accordance with a third merging rule using the skew detected by said skew detecting means, so that the third areas obtained by said second merging means are discriminated from each other in the binary image.

2. The system as claimed in claim 1, wherein a circumscribed rectangle of an image formed of connected black pixels is defined as the first area.

3. The system as claimed in claim 2, further comprising:

separator detecting means for detecting white separators, each of which is a white space lying between columns and having a width equal to or greater than a predetermined value, wherein each of the second and third merging rules includes a condition depending on the white separator.

4. The system as claimed in claim 3, wherein said separator detecting means has first means for dividing the reduced image into bands each band extending in a direction approximately parallel to a direction in which each character string extends in the binary image, second means for extracting white space segments in each band, each of the white space segments being positioned between black space segments corresponding to projections of blocks, included in and overlapping said each band, in a direction perpendicular to the direction in which said each band extends, third means for connecting the white space segments in the direction perpendicular to a direction depending on the skew detected by said skew detecting means, and fourth means for determining whether or not each set of white space segments connected to each other by said third means is a white separator in accordance with a predetermined rule.

5. The system as claimed in claim 4, wherein said fourth means has means for determining, when a length of the set of white space segments is equal to or greater than predetermined value, that a set of white space segments connected to each other is a white separator.

6. The system as claimed in claim 4, wherein said fourth means includes:

means for determining, when two sets of white space segments are close to each other, that a shorter set of white space segments from among the two sets of white space sediments is not a white separator.

7. The system as claimed in claim 4, wherein said fourth means has includes:

means for determining, when there are a plurality of sets of white space segments within a predetermined distance from a particular set of white space segments, that the particular set of white space segments is not a white separator.

8. The system as claimed in claim 4, wherein said fourth means includes:

means for determining that a set of white space segments positioned at a circumference of the binary image is not a white separator.

9. The system of claim 1, wherein:

a distance between the blocks to be merged into the second area in accordance with the second merging rule is greater than a distance between the first areas merged into each of the blocks.

10. The system of claim 1, wherein:

the first merging rule includes no condition depending on the skew detected by said skew detecting means.

\* \* \* \* \*

UNITED STATES PATENT AND TRADEMARK OFFICE
CERTIFICATE OF CORRECTION

PATENT NO. : 5,613,016
DATED : March 18, 1997
INVENTOR(S) : Takashi Saitoh

It is certified that error appears in the above-indentified patent and that said Letters Patent is hereby corrected as shown below:

Column 1, line 16, after "plurality" delete the hyphen -- - --.

Column 2, line 60, change "obtaine" to --obtain--.

Column 2, line 61, change "coresponding" to --corresponding-.

Column 6, line 61, change "In addition, In" to --In addition, in--.

Column 12, line 38, change "sediments" to --segments--.

Signed and Sealed this

Nineteenth Day of August, 1997

*Attest:*

BRUCE LEHMAN

*Attesting Officer*      *Commissioner of Patents and Trademarks*